United States Patent [19]

Sandvick et al.

[11] Patent Number: 5,491,190

[45] Date of Patent: Feb. 13, 1996

[54] REPULPABLE HOT MELT POLYMER/FATTY ACID COMPOSITIONS FOR FIBROUS PRODUCTS

[75] Inventors: Paul E. Sandvick; Calvin J. Verbrugge, both of Racine County, Wis.

[73] Assignee: S. C. Johnson & Son, Inc., Racine, Wis.

[21] Appl. No.: 96,523

[22] Filed: Jul. 22, 1993

[51] Int. Cl.[6] .............................. C08J 3/20; C08K 5/09; C08L 33/00
[52] U.S. Cl. .................... 524/322; 524/556; 524/773; 524/776; 524/832; 524/833
[58] Field of Search .................... 524/322, 556, 524/773, 776, 832, 833

[56] References Cited

U.S. PATENT DOCUMENTS

| | | | |
|---|---|---|---|
| 1,628,931 | 5/1927 | Todd | 162/8 |
| 2,275,659 | 3/1942 | Steinle et al. | 99/168 |
| 2,391,621 | 12/1945 | Powell, III et al. | 117/65 |
| 2,490,677 | 4/1946 | Cupery et al. | 260/29.6 |
| 2,576,914 | 2/1948 | Barrett | 117/155 |
| 2,599,339 | 12/1949 | Lippincott et al. | 260/28.5 |
| 2,676,934 | 11/1951 | Butler | 260/28.5 |
| 3,001,963 | 9/1961 | Higgins | 260/23 |
| 3,020,178 | 2/1962 | Sweeney et al. | 117/155 |
| 3,039,870 | 6/1962 | Laakso et al. | 96/87 |
| 3,165,485 | 1/1965 | Ilnyckyj et al. | 260/28.5 |
| 3,262,838 | 7/1966 | Vieth et al. | 162/8 |
| 3,287,149 | 11/1966 | Dooley et al. | 117/15 |
| 3,312,564 | 4/1967 | Barbour | 117/36.1 |
| 3,320,196 | 5/1967 | Rogers | 260/27 |
| 3,338,856 | 8/1967 | Arabian et al. | 260/28.5 |
| 3,392,131 | 7/1968 | Miles et al. | 260/28.5 |
| 3,417,040 | 12/1968 | Kremer | 260/27 |
| 3,428,591 | 2/1969 | Lewis | 260/28.5 |
| 3,461,108 | 8/1969 | Heilman | 260/78.5 |
| 3,520,842 | 7/1970 | Crean | 260/23 |
| 3,553,177 | 1/1971 | Hazen et al. | 260/78.5 |
| 3,560,455 | 2/1971 | Hazen | 260/78.5 |
| 3,560,456 | 2/1971 | Hazen | 260/78.5 |
| 3,560,457 | 2/1971 | Hazen | 260/78.5 |
| 3,629,171 | 12/1971 | Kremer et al. | 260/23.7 B |
| 3,706,704 | 12/1972 | Heilman | 260/78.5 R |
| 3,822,178 | 7/1974 | Von Koeppen et al. | 162/5 |
| 3,884,857 | 5/1975 | Ballard et al. | 260/28.5 |
| 3,991,079 | 11/1976 | Hoke | 260/327 E |
| 4,013,607 | 3/1977 | Dwyer et al. | 260/29.6 H |
| 4,117,199 | 9/1978 | Gotoh et al. | 428/486 |
| 4,168,255 | 9/1979 | Lewis et al. | 260/29.6 H |
| 4,289,671 | 9/1981 | Hernandez | 260/28.5 AV |
| 4,317,893 | 3/1982 | Chen et al. | 525/328 |
| 4,362,784 | 12/1982 | Kato et al. | 428/340 |
| 4,540,736 | 9/1985 | Herten et al. | 524/556 |
| 4,562,226 | 12/1985 | Coombes et al. | 524/767 |
| 4,588,786 | 5/1986 | Kadono et al. | 525/327.6 |
| 4,618,450 | 10/1986 | Higgins | 252/355 |
| 4,668,536 | 5/1987 | Goodell et al. | 427/235 |
| 4,675,359 | 6/1987 | Kadono et al. | 524/832 |
| 4,693,909 | 9/1987 | Ziegler et al. | 427/156 |
| 4,748,196 | 5/1988 | Kuroda et al. | 524/43 |
| 4,826,902 | 5/1989 | Hanabata et al. | 524/168 |
| 4,859,752 | 8/1989 | Bosanec et al. | 526/209 |
| 4,871,823 | 10/1989 | Billman et al. | 526/272 |
| 4,942,193 | 7/1990 | Van Buskirk et al. | 524/276 |
| 5,081,174 | 1/1992 | Van Buskirk et al. | 524/277 |
| 5,081,174 | 1/1992 | Van Buskirk et al. | 524/277 |
| 5,298,568 | 3/1994 | Suzuki | 525/327 |
| B1 4,358,573 | 11/1983 | Verbrugge | 526/272 |

FOREIGN PATENT DOCUMENTS

| | | | |
|---|---|---|---|
| 49-85305 | of 1974 | Japan. | |
| 56-91097 | of 1981 | Japan. | |
| 2-1671 | of 1990 | Japan. | |
| 1593331 | 7/1981 | United Kingdom | C08K 5/09 |
| WO91-05107 | 4/1991 | WIPO | D21H 19/18 |

OTHER PUBLICATIONS

J. S. Michelman, "Repulpability of coated corrugated paperboard," *Tappi Journal*, Oct., 1991, p. 79ff.

Article, *Tappi Journal*, vol. 75, No. 4, Apr., 1992, pp. 37, 39.

T. Kauffman, "Environmentally Conscious Hot Melt Adhesives," *Tappi Notes, 1991 Hot Melt Symposium*, pp. 13–22.

J. G. E. McEwen, et al. "Improving the repulpability of wax coated corrugated paperboard," *Tappi Journal*, vol. 76, No. 7, Jul., 1993, pp. 116–121.

*Primary Examiner*—Paul R. Michl
*Assistant Examiner*—U. K. Rajguru
*Attorney, Agent, or Firm*—R. E. Rakoczy; J. W. Frank

[57] ABSTRACT

Hot melt polymer/fatty acid compositions are described that render fibrous products such as paper, paperboard and corrugated paper containers water-resistant at room temperature, but enable such articles to be repulped and recycled when the coated articles are repulped in a heated nearly neutral to alkaline pH aqueous medium. The compositions comprise from about 5% to 50% by weight of an addition polymer of from about 5 to 95 mole percent of an ethylenically unsaturated monocarboxylic acid or 50 to 95 mole percent of an ethylene-1,2-dicarboxylic acid or anhydride and the balance to a total of 100 mole percent of at least one additional ethylenically unsaturated monomer selected from the group consisting of 1-alkenes having from about 4 to 60 carbon atoms; alkyl vinyl ethers having an ether alkyl group of from about 8 to 60 carbon atoms, and alkyl acrylates or alkyl methacrylates having an alkyl group of from about 8 to 60 carbon atoms; optionally from about 1 to 90 mole percent of the carboxyl groups in the polymer may be further modified by reaction with a substituted or unsubstituted monoalcohol or monoamine; and from about 50% to 95% by weight of at least one fatty acid selected from the group consisting of natural or synthetic fatty acids containing from about 12 to 48 carbon atoms, wherein the fatty acid is compatible with the polymer and the composition is a solid at 20° C., but starts to become fluid between about 50° C. to 95° C.

12 Claims, No Drawings

REPULPABLE HOT MELT POLYMER/FATTY ACID COMPOSITIONS FOR FIBROUS PRODUCTS

TECHNICAL FIELD

This invention relates to a hot melt polymer/fatty acid composition that renders cellulosic fibers, paper, paperboard and corrugated paper containers water-resistant at room temperature, but enables such articles to be repulped and recycled when the articles coated or impregnated with such compositions are placed in a heated nearly neutral to alkaline pH aqueous medium.

BACKGROUND ART

For quite some time, water-resistant paper and paperboard articles have been used as wrapping or packaging for moist or wet foods, many of which are refrigerated. For example, corrugated paperboard containers are cascade-coated or curtain-coated with paraffin wax-based compositions applied by passing the corrugated paper containers beneath a curtain of molten paraffin wax. These water-resistant containers are then used for packaging produce, meats, poultry and fish that must be refrigerated. Often the containers themselves are filled with ice in addition to the food itself. Ordinary untreated paperboard containers cannot withstand such exposure to water.

U.S. Pat. No. 4,668,536 to Goodell et al. teaches an apparatus for applying a coating of paraffin wax to sheets of corrugated paperboard by feeding the sheets through a bath of molten wax held in an elongated tank. Corrugated paper containers produced by such processes have not been considered recyclable because the wax cannot be efficiently separated from the fibers making up the paper using conventional repulping equipment.

Ecological concerns have focused on disposal of water-resistant paper and corrugated paper containers because landfills have been filling up at an alarming rate. If such containers could be recycled, this would reduce the amount of waste containers that must be placed in landfills as well as the amount of virgin timber needed to produce the paper.

U.S. Pat. No. 1,628,931 to Todd teaches a process for extracting wax from waxed paper by treating it with a solution of aqueous trisodium phosphate alone or with other alkaline materials. The wax becomes emulsified, leaves the paper fibers and rises to the top of the treating solution where it can be skimmed off. The process also serves to de-ink the papers.

An article by J. S. Michelman et al. entitled "Repulpability of coated corrugated paperboard" in the October 1991, *Tappi Journal*, pp. 79ff, notes that curtain coated hot melt wax compositions are considered to be non-repulpable. It proposes the use of water-based coatings in place of hot melt wax curtain coatings. The Michelman et al. article states water-based coatings provide certain advantages in that they do not contain solvents, are nonflammable and yet have the ability to provide water and grease resistance to corrugated paper containers.

Water-based coatings do provide these advantages, but their use requires a change in the type of coating equipment used to manufacture coated, water-resistant paper, paperboard and corrugated paper containers. In practice, these coatings do not have sufficient water resistance to withstand long periods of exposure to ice water such as is required for produce or meat containers. Use of water-based coatings on hydrophilic substrates such as corrugated paper produces a wet surface that must then be dried by the application of heat.

Hot melt coatings are typically solvent-free and applied at 60°–95° C. depending upon the type of water-resistant agent being used. Hot melt coatings immediately solidify as they cool below their melting point. Thus, they do not require a significant further drying step of the type which may be necessary with water-based coatings. An increase in the drying time or energy needed to dry the coatings is a disadvantage because it increases cost and lengthens the time needed before the paper or corrugated paper containers can be handled. In a conventional cascade or curtain coating process, corrugated paper containers are placed at one end of a cascade or curtain coating machine having a "curtain" or wall of molten wax coating that is poured continuously over the containers passing through the curtain. After coating, the containers pass through an area of the machine that has a fan to blow ambient air over the containers and reduce their temperature to the point where the hot melt coating solidifies. The containers are then simply removed from the other end of the machine and stacked for shipping. Thus, hot melt coatings have the advantage of being relatively easy to process. They do not require a change in coating equipment from the type of equipment already owned by many commercial manufacturers of coated paper and corrugated paper containers.

Therefore, there is a need for a hot melt coating for use with paper such as wax paper for food wrap, paperboard containers such as milk and juice cartons and corrugated paper containers such as those used to package produce, meats, poultry and fish that permits the paper articles to be repulped and recycled, but can be applied using conventional hot melt wax coating equipment.

Patent Cooperation Treaty Published International Patent Application No. WO 91/05107 to Michelman teaches repulpable hot melt paper coatings which are a combination of at least one wax and at least one chemical compound incorporated within the wax where the compound is capable of dispersing the wax in a substantially aqueous environment. The compound must by itself act as a dispersant for the wax or must be capable of being chemically modified so as to act as a latent dispersant for the coating in an aqueous environment. The compound may be a nonionic, anionic or cationic emulsifier, dispersant, surfactant or surface acting agent. Examples of anionic dispersants are said to include acids, esters, alcohols, sulfonates and soaps. A specific example of an anionic dispersant given is stearic acid in an amount of from about 10% to 30% by weight and it is becomes capable of emulsifying or dispersing the coating by subjecting the coating containing the stearic acid to an aqueous solution of a strong base such as sodium hydroxide or potassium hydroxide. However, the Michelman International Application does not suggest our use of polymers which contain carboxyl groups which will be described below.

A recent article from the April, 1992, *Tappi Journal*, Vol. 75, No. 4, pages 37 and 39 refers to work done by IL Returpapper, the largest Scandinavian wastepaper collector, and some of its owners on the repulping of waxed corrugated boxes. The article reports that their work focused on the use of self-dispersing waxes based on the addition of aluminum stearate soaps to the wax blend. The article states such aluminum soaps neither reduce the water resistance nor increase the water vapor permeability of the wax film. Under slightly alkaline conventional repulping conditions, the aluminum soaps are said to dissociate and form sodium soaps that disperse the wax away from the paper pulp.

One problem associated with prior art hot melt wax coatings is a tendency for such coatings to stress crack when the coated article is bent or formed.

U.S. Pat. No. 3,629,171 to Kremer et al. provides a hot melt wax composition having reduced stress cracking composed of a wax such as paraffin, an ethylene-vinyl acetate copolymer, a sufficient amount of a wax-compatible, non-corrosive carboxylic acid such as oleic acid, lauric acid, and pentacosanoic acid to provide the composition with a total acid number of from 5 to 200, and a solid butyl rubber. The carboxylic acid can be present in an amount of from 10–150 parts per 100 parts of wax such as paraffin. Nothing is said about the repulpability of such compositions.

U.S. Pat. No. 3,417,040 to Kremer is similar to the '171 Patent in that it requires a wax such as paraffin, an ethylene/vinyl acetate copolymer and an acid component. However, the acid component must contain at least 35% by weight acid and at least 5% by weight liquid of boiling point greater than 300° F. (149° C.) at 7 mm Hg pressure. The goal is a wax composition with increased melt viscosity that permits lowering the ethylene/vinyl acetate copolymer concentration in the coating. Examples of liquids are liquid organic carboxylic aids, mineral oils or a styrene, butene or propene polymer.

U.S. Pat. No. 3,001,963 to Higgins teaches hot melt wax compositions that have a reduced tendency to foam due to the presence of a mixture of a polymeric vinyl ester such as polyvinyl caproate and stearic acid. Higgins teaches that the stearic acid is preferably used in an amount that does not exceed 0.1%. Similarly, the polyvinyl caproate is used in an amount of from about 1 to 25 p.p.m. of the total composition.

U.S. Pat. No. 3,338,856 to Arabian et al. teaches blends of waxes with up to 50% of copolymers of ethylene and terminally ethylenically unsaturated organic compounds containing 3–5 carbon atoms such as alpha-olefins, vinyl acetate, and ethyl acrylate. The presence of the polymer is said to reduce solid phase separation or blooming on the surfaces of the coatings made from such blends. The coatings are used on paper and carton boards as well as fibers and cloth. Nothing is taught concerning repulpability.

U.S. Pat. No. 3,165,485 to Ilnyckyj et al. teaches sealing waxes used to coat materials such as paper for wrapping bread where the wax further includes 10–40% of a copolymer of ethylene and a diester of fumaric or maleic acid. Nothing is taught concerning repulpability.

U.S. Pat. No. 4,362,784 to Kato et al. teaches packaging materials for food products which are poured into the package in a molten state. The packaging materials are coated with a blend of (a) an ethylene/vinyl acetate polymer, (b) a copolymer of ethylene or an alpha olefin with, for example, maleic anhydride, optionally, (c) a tackifying agent such as a specific blend of (a) with an olefin/maleic anhydride resin, and, optionally, (d) 1–10% of a wax.

Other wax-based compositions that can be applied by a hot melt method as well as from a solvent solution include U.S. Pat. No. 2,599,339 to Lippincott et al. Lippincott teaches improved wax compositions that contain copolymers of ethylene-1,2-dicarboxylic acids such as maleic acid with comonomers such as ethylene, octylene and octadecene as well as other unsaturated acids such as acrylic acid or unsaturated esters such as vinyl acetate or allyl stearate. Before adding the copolymer to the wax to make the coating composition, the copolymer is modified with an alcohol or an amine such as ethyl alcohol, ethyl amine, diethylamine, octadecyl amine or dioctadecylamine. The waxes are then modified by the addition of 0.5% to 5% or more, preferably from 0.1% to 1% of the modified copolymer.

U.S. Pat. No. 2,676,934 to Butler teaches hydrocarbon wax compositions for impregnating wrapping paper that further contain from 0.1% to 30% by weight of an esterified styrene-maleic anhydride resin. The styrene-maleic anhydride polymer is completely esterified with a fatty alcohol such as decyl, dodecyl or hexadecyl alcohol. The coating is said to be more resistant to cracking and crushing.

U.S. Pat. No. 3,428,591 to Lewis teaches a wax composition containing a graft polymer of polyethylene used to coat paperboard. The preferred coating is composed of 96–99.1% wax such as paraffin or microcrystalline waxes and 0.1–4% of a polyethylene graft copolymer where the polyethylene contains 0.1–5% by weight of maleic anhydride grafted to the polyethylene chain. This coating can be applied as a hot melt or by a solvent system. It gives superior wet strength to paperboard.

U.S. Pat. No. 3,287,149 to Dooley et al. teaches repulpable printed paper having a water-resistant coating formed from a copolymer that is the copolymerization product of (a) styrene with (b) a half-ester of an alcohol having 1 to 8 carbon atoms with an unsaturated dicarboxylic acid such as fumaric or maleic acid. These compositions are applied by dissolving the polymers in water. They are removed by exposing the coated paper to a 2% aqueous sodium hydroxide solution of the type commonly used in commercial paper de-inking processes. However, the Dooley et al. Patent compositions are applied as aqueous solutions and thus are not suitable for application by conventional cascade or curtain coating equipment.

U.S. Pat. No. 3,262,838 to Vieth et al. is similar to the Dooley '149 Patent above. However, Vieth et al. teach a repulpable paper made from a coating composition applied from a solvent solution that comprises 15–30% of an acrylic acid/acrylic ester polymer and a thermosetting aminoplast resin. The entire water-resistant coating composition is composed of these two ingredients. Paper coated with the composition is said to be repulpable in a dilute alkaline aqueous solution. However, the compositions are applied from solvent solutions, not from conventional cascade or curtain coating equipment.

U.S. Pat. No. 2,391,621 to Powell, III, et al. teaches a method of coating paper to increase its moisture resistance using a coating composition based on a polymer containing three different components: maleic anhydride, vinyl halides and vinyl esters of lower fatty acids. The coating may contain a wax in an amount of from about 1–50% of the polymer. Nothing is taught about the repulpability of such a composition which is applied from a solvent solution or from an aqueous emulsion.

As noted in the Michelman et al. Article above, water-based coating compositions have also been pursued for making paper and paper-based containers water-resistant. These coatings have been described as leaving the paper products repulpable.

U.S. Pat. No. 4,117,199 to Gotoh et al. teaches a coated paper made by coating a paper substrate with an aqueous emulsion containing a synthetic rubber latex and a wax emulsion in an amount of 5 to 200 parts by weight of the solid wax per 100 parts by weight of the solid synthetic rubber in the latex. The coated paper is then dried at a temperature that is the same as or higher than the melting point of the wax. The resulting coated paper is said to be highly repulpable. The synthetic rubber latex is made from copolymers of butadiene with at least one ethylenically unsaturated monomer such as methyl methacrylate, styrene and acrylonitrile. The synthetic rubber may further contain at least one ethylenically unsaturated carboxylic acid such as acrylic acid, methacrylic acid, crotonic acid and maleic acid. The Gotoh et al. compositions are aqueous and are not applied from conventional cascade or curtain coating equipment.

U.S. Pat. No. 2,576,914 to Barrett teaches coated papers made by applying a dispersion or suspension of a suitable pigment along with a long chain unsaturated fatty acid and a copolymer that is an alkyl half-ester of maleic anhydride copolymerized with a polymerizable vinyl compound. These coating compositions are preferably applied as aqueous liquids. A wax can be present in small proportions as an adjuvant.

British Pat. No. 1,593,331 to Vase teaches a method for treating paper and paperboard to make them water and vapor resistant by coating them with an unpigmented aqueous latex coating composition. The latex coating composition is an acrylic polymer and a metal stearate or wax where the wax is at least 20% by weight of the total acrylic polymer and metal stearate present. The metal stearate is preferably calcium stearate. After application, the coating is dried onto the paper. It contains 50–80% acrylic polymer.

Other examples of aqueous emulsions and emulsifiable compositions for coating paper and the like are found in U.S. Pat. Nos. 3,020,178 to Sweeney et al. (dispersions of water insoluble linear polymers of esters of acrylic acid or methacrylic acid which may further contain adhesion-promoting agents such as carboxylic acids in the form of free acids or salts); U.S. Pat. No. 3,392,131 to Miles et al. (salts of ethylene-crotonic acid polymers as emulsifying agents for paraffin waxes and asphalt); and U.S. Pat. No. 3,520,842 to Crean (blends of petroleum wax, a polymeric olefin material and a fatty acid are added as a blend to water containing an amine soap-forming agent such as an alkanolamine, agitating the mixture and subjecting it to homogenization to form an aqueous emulsion coating composition).

Japanese Kokoku Pat. No. HEI 2[1990]-1671 to Yamazaki et al. teaches water vapor-resistant corrugated board made by coating the board with a mixture of an acrylic emulsion and a wax emulsion and drying the coating. The objective is to obtain recyclable paperboard. The acrylic emulsion is said to be an "acryl-styrene" emulsion in an amount of from 90:50 to a wax emulsion in an amount of 10–50. Due to the water present, the coatings must be dried using hot-air heating, infrared heating or microwave heating.

Japanese Kokai Patent Application No. SHO 56[1981]-91097 to Kano et al. teaches a method for the manufacture of paper for fruit bags. The paper is treated with an aqueous emulsion consisting of 81–93% of petroleum wax, 5–15% of fatty acids such as stearic acid and 2–4% of a resin such as a melamine-formaldehyde resin or a methyl methacrylate resin. These coatings are said to make the paper water-repellent for a long period. The resins can be selected from one or more of styrene, methylmethacrylate, and methacrylic acid resins.

Japanese Kokai Patent Application No. SHO 49[1974]-85305 to Fujiya et al. teaches a method for the manufacture of waterproof paper that is redispersible with warm water. It is made by soaking the paper with a polyethylene emulsion or with blends of aluminum salts and waxes such as paraffin or zirconium salts and wax. The coating material was only identified by the manufacturer's name for the materials used.

U.S. Pat. No. 4,748,196 to Kuroda et al. teaches a water repellent composition which is an aqueous emulsion prepared by emulsifying in water (A) a wax having a melting point from 40° C. to 90° C. and (B) a 1-alkene/maleic anhydride polymer, or a partially esterified product thereof, in the presence of (C) a water soluble alkaline compound and/or a nonionic emulsifier. The emulsions are used to impart water repellency to gypsum, cement, paper, wooden boards or fibers. Nothing is suggested regarding repulpability of articles treated with such emulsions.

U.S. Pat. No. 3,312,564 to Barbour teaches transfer sheets that are a base sheet coated with an aqueous emulsion of a hard wax, a non-film forming resin, a fatty acid and a base followed by hardening the coating onto the base sheet. The coatings are heated to transfer them permanently to a substrate where the heat fixes the transfer to the substrate and makes it smudge proof. Nothing is taught about the use of such coatings for making paper substrates water-resistant and later repulpable.

U.S. Pat. No. 2,275,659 to Steinle et al. teaches a water removable wax coating that is placed on the skin or peel of a fruit or vegetable. The coating is an aqueous coating containing both a wax and a substance that will swell upon contacting a volume of water thereby causing the protective coating to loosen itself from the skin or peel. Examples of such swellable materials are bentonite, gelatin, Irish moss and gums such as karaya, tragacanth and arabic. Since these compositions are always sensitive to water, they could not be used to render paper or paperboard products water-resistant.

In the area of coatings for substrates such as floors, U.S. Pat. No. 3,320,196 to Rogers teaches a coating composition containing a polyligand emulsion polymer that is (a) a terpolymer of a methacrylate monomer, an unsaturated monomer having a carboxylic acid group and an unsaturated monomer that is free of methyl groups on the alpha carbon atom, (b) a resin cut of a low molecular weight alkali soluble resin which can be a maleic anhydride or acrylic acid resin, (c) an aqueous base, and (d) a zirconium derivative that is used to reversibly cross-link the polymers. Waxes and fatty acid soaps may also be optionally included. The coatings formed can be removed by exposing them to aqueous alkaline solutions. The coatings function as floor polishes that are strippable using aqueous alkaline solutions.

U.S. Pat. No. 4,013,607 to Dwyer et al. teaches self-stripping coating compositions similar to those taught by Rogers which may include waxes, but which require a pH of greater than 9 and do not require the use of zirconium-derivatives to achieve self-stripping properties. These compositions are said to be useful for coating rigid surfaces such as for use as self-strippable floor coatings although they can also be used to impregnate textiles, leather, paper, or other porous or fibrous materials.

Thus, although a number of different types of coatings have been proposed, there is still a need for a hot melt coating composition for use in rendering fibrous materials such as paper and paper-based materials water-repellent using conventional curtain coating equipment, but which permits the coated paper or paper-based product to be recycled using conventional repulping equipment and techniques.

SUMMARY DISCLOSURE OF THE INVENTION

One object of this invention is to provide compositions for rendering paper, paperboard and corrugated paper articles water-resistant, but that can later be removed to recover the paper pulp using conventional paper repulping equipment and solutions. These coatings can also be used as hot melt impregnating or binder compositions for binding masses of, for example, cellulosic fibers together to form molded fibrous products. Another object of this invention is to provide such compositions in a form that can be applied using conventional hot melt wax paper, paperboard and corrugated paper coating equipment such as curtain coating or cascade coating machinery. The presence of the polymer may provide improved flexibility to the compositions of the present invention.

A particularly advantageous object of this invention is to provide such coating compositions that can be removed using heated aqueous solutions of pH values from about 7.1 to 13, more preferably from about 7.1 to 11 and, most preferably, having nearly neutral to slightly alkaline pH values in the range of from about 7.1 to 8.5. Since both the polymer and the fatty acid have carboxyl groups which become hydrophilic upon exposure to bases, the compositions of the present invention have the advantage of providing coated fibrous articles that are easier to repulp.

These and other objects of the present invention are provided by a hot melt polymer/fatty acid composition that is dispersible in a heated nearly neutral to alkaline pH aqueous medium comprising A. from about 5% to 50%, more preferably from about 10% to 30%, and most preferably, from about 10% to 25% by weight based upon the total weight of the composition of at least one addition polymer selected from the group consisting of (i) a polymer of from about 5 to 95 mole percent of at least one unsaturated monocarboxylic acid monomer containing a free carboxyl group such as acrylic acid and from about 5 to 95 mole percent of at least one additional ethylenically unsaturated monomer, (ii) a polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group, preferably maleic anhydride, and from about 5 to 50 mole percent of at least one additional ethylenically unsaturated monomer, and (iii) a polymer of a total of from about 5 to 95 mole percent of at least one of the ethylenically unsaturated monocarboxylic acid monomers and at least one of the ethylenically-unsaturated dicarboxylic monomers and from about 5 to 95 mole percent of at least one additional ethylenically unsaturated monomer, wherein the additional ethylenically unsaturated monomer is selected from the group consisting of 1-alkenes having from about 4 to 60 carbon atoms, alkyl vinyl ethers having an ether alkyl group of from about 8 to 60 carbon atoms, and alkyl acrylates and methacrylates having an alkyl group of from about 8 to 60 carbon atoms, such as a polymer of (i) 50 to 95 mole percent maleic anhydride with (ii) 5 to 50 mole percent of (a) 1-decene or 1-octadecene, or (b) a blend of 1-alkenes having from about 20 to 24 or from about 24 to 28 carbon atoms or (c) a combination of (a) and (b) wherein from about 1 to about 90 mole percent of the carboxyl groups contributed to the polymer by the monocarboxylic acid monomer or by the dicarboxylic acid monomer may optionally be further partially esterified or converted into amide or imide groups such as by reaction with an alcohol or an amine such as taurine; and B. from about 50% to 95%, more preferably from about 70% to 90%, and most preferably, from about 75% to 90% by weight based upon the total weight of the composition of at least one fatty acid selected from the group consisting of natural or synthetic fatty acids containing from about 12 to 48 carbon atoms, preferably from 16 to 22 carbon atoms, such as stearic acid, wherein the fatty acid is compatible with the polymer and wherein the composition is a solid at 20° C., but starts to become fluid between about 50° C. and 95° C.

BEST MODE FOR CARRYING OUT THE INVENTION

The hot melt polymer/fatty acid compositions of the present invention require two ingredients to render them suitably redispersible in a heated nearly neutral to alkaline pH aqueous medium.

The first required ingredient is at least one of (i) at least one addition polymer of from about 5 to 95 mole percent of an ethylenically unsaturated monocarboxylic acid and from about 5 to 95 mole percent of at least one additional unsaturated monomer or (ii) an addition polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group and from about 5 to 50 mole percent of at least one additional ethylenically unsaturated monomer, or combinations of such polymers. The additional ethylenically unsaturated monomer is selected from the group consisting of 1-alkenes having from about 4 to 60 carbon atoms, alkyl vinyl ethers having an ether alkyl group of from about 8 to 60 carbon atoms, and alkyl acrylates and methacrylates having an alkyl group of from about 8 to 60 carbon atoms. The polymer is required to be compatible with the fatty acid described below at room temperature (hereinafter about 20° C. to 25° C.). The term "compatible" means that the fatty acid can be melt dispersed into the polymer without significant formation of separate phases when the blend of polymer and fatty acid is cooled to room temperature. More preferably, the polymers are addition polymers of 50 to 95 mole percent of an ethylene-1,2-dicarboxylic acid or anhydride and from about 5 to 50 mole percent of the above 1-alkenes.

The polymers must have a melting point that is such that the combination of polymer and fatty acid is a solid at the coated or impregnated product's expected temperature of use such as room temperature. However, the hot melt polymer/fatty acid composition must also start to become fluid between about 50° and 95° C., so that the composition can be coated at temperatures no greater than about 130° C. and so that repulping can take place in a heated nearly neutral to alkaline pH aqueous medium. One of ordinary skill in the art can readily determine the types of compositions meeting this requirement simply by evaluating the melting points and viscosities of the compositions.

Use of polymers containing sufficient carboxyl groups to render the polymer and thus, the hot melt polymer/fatty acid composition, water sensitive at the temperature of use should be avoided. The polymers used must be water-resistant at the desired temperature of use to be useful in the present invention.

The term "ethylenically unsaturated monocarboxylic acid" includes acrylic acid, methacrylic acid, crotonic acid, aconitic acid, itaconic acid and the like. Acrylic acid and methacrylic acid are presently preferred.

The ethylene-1,2-dicarboxylic acid or anhydride includes maleic acid, methyl maleic acid, dimethyl maleic acid, fumaric acid, and other alkylated maleic and fumaric acids as well as their anhydride analogs such as maleic anhydride and derivatives thereof. For example, other derivatives of ethylene-1,2-dicarboxylic acids or their anhydride analogs also may be useful such as benzyl maleic acid. In any event, the ethylene-1,2-dicarboxylic acid or anhydride must be capable of providing an addition polymer that is soluble in the fatty acid, but is capable of acting to disperse the hot melt polymer/fatty acid composition away from coated or impregnated substrates upon exposure to nearly neutral to alkaline heated aqueous media as a result of the carboxylic acid groups that are ionized by neutralization to make them hydrophilic.

As will be described below, in some cases, the ethylenically unsaturated monocarboxylic acid or ethylene-1,2-dicarboxylic acid or anhydride may be further modified by esterification, imidization or amidation to enable the polymer to more effectively remove the hot melt polymer/fatty acid composition from a substrate coated or impregnated with it. Maleic anhydride is the presently preferred unsaturated dicarboxylic acid monomer.

It is also contemplated that polymers containing both an unsaturated monocarboxylic acid monomer and an unsaturated dicarboxylic acid monomer as well as the additional ethylenically unsaturated monomers will be useful in the compositions of the present invention.

The additional ethylenically unsaturated monomers that are reacted by conventional addition polymerization with the ethylenically unsaturated monocarboxylic acid or ethylene-1,2-dicarboxylic acid or anhydride provide the polymer with solubility in the hydrophobic fatty acid present in the compositions of the present invention. One or more of these monomers can be used. The carbon chain length of the additional ethylenically unsaturated monomer is selected to provide the desired degree of compatibility with the fatty acid. Preferably, more than one additional ethylenically unsaturated monomer is used since this enables one to more easily balance the hydrophobicity of the polymer needed for fatty acid compatibility and water resistance with the hydrophilicity contributed by the carboxylic acid groups, the latter of which is needed to carry the composition away from the coated fibrous product during repulping operations. A combination of a lower chain length monomer with a higher chain length monomer or blend of monomers such as a combination of 50 to 95 mole percent of maleic anhydride with 5 to 50 mole percent of a combination of 1-decene with a $C_{20}$–$C_{24}$ 1-alkene blend in a 50:50 mole ratio or 1-octadecene with a $C_{24}$–$C_{28}$ 1-alkene blend in a 20:80 mole ratio can provide this desirable balance of properties. Aromatic monomers such as styrene and alpha-methyl styrene may render the polymer incompatible with the fatty acids and thus are used in very limited amounts of no more than about 10 to 20 mole percent and, more preferably, are not included in the polymers used in the present invention.

The alkyl vinyl ethers useful as comonomers are those having an ether alkyl group of from about 8 to 60 carbon atoms such as octyl vinyl ether, lauryl vinyl ether, hexadecyl vinyl ether, octadecyl vinyl ether, behenyl vinyl ether, triacontyl vinyl ether, tetracontyl vinyl ether and hexacontyl vinyl ether. Monomers having ether alkyl groups of from about 12 to 22 carbon atoms are preferred such as octadecyl vinyl ether.

The alkyl acrylates and alkyl methacrylates useful as comonomers are those having an alkyl group of from about 8 to 60 carbon atoms such as octyl acrylate, octyl methacrylate, lauryl acrylate, lauryl methacrylate, hexadecyl acrylate, hexadecyl methacrylate, octadecyl acrylate, octadecyl methacrylate, behenyl acrylate, behenyl methacrylate, triacontyl acrylate, triacontyl methacrylate, tetracontyl acrylate, tetracontyl methacrylate, hexacontyl acrylate and hexacontyl methacrylate. Monomers having alkyl groups of from about 12 to 22 carbon atoms are preferred.

The 1-alkenes suitable for use in the compositions of the present invention have from 4 to about 60 carbon atoms and include the following: 1-butene; 1-pentene; 1-hexene; 1-heptene; 1-octene; 1-nonene; 1-decene; 1-dodecene; 1-tetradecene; 1-hexadecene; 1-heptadecene; 1-octadecene; 2-methyl-1-butene; 3,3-dimethyl-1-pentene; 2-methyl-1-heptene; 4,4-dimethyl-1-heptene; 3,3-dimethyl-1-hexene; 4-methyl-1-pentene; 1-eicosene; 1-docosene; 1-tetracosene; 1-hexacosene; 1-octacosene; 1-triacontene; 1-dotriacontene; 1-tetratriacontene; 1-hexatriacontene; 1-octatriacontene; 1-tetracontene; 1-dotetracontene; 1-tetratetracontene; 1-hexatetracontene; 1-octatetracontene; 1-pentacontene; 1-hexacontene and mixtures thereof with straight chain 1-alkenes being presently preferred.

Optionally, other additional ethylenically unsaturated monomers may be included in minor amounts of up to 50 mole percent, more preferably no more than about 10 mole percent, of the total polymer to provide specific properties provided that such monomers do not detrimentally to a significant degree affect the water resistance of the hot melt compositions or the ability of the polymers to be removed upon exposure to heated nearly neutral to alkaline aqueous media. Examples of such monomers may be organounctional monounsaturated monomers such as polyethoxylated acrylates and methacrylates as well as acrylates and methacrylates containing sulfate or sulfonate groups. Examples of such monomers are SIPOMER® HEM-5 which is $H_2CC(CH_3)COO(CH_2CH_2O)_5H$ and SIPOMER® HEM-10 which is $H_2CC(CH_3)COO(CH_2CH_2O)_{10}H$ which are available from Rhone-Poulenc Surfactants & Specialties of Cranbury, N.J., an ethoxylated nonylphenol acrylate sold under the designation "CD-504" by Sartomer Company, Inc. of West Chester, Pa., Behenylpolyethoxyethyl Methacrylate (BPEEM) which is $H_2C=C(CH_3)COO(CH_2CH_2O)_{25}C_{22}H_{45}$ sold under the tradename SIPOMER® BEM by Rone-Poulenc, and the series of proprietary surface active monomers available under the designations "SAM 185N, 186N and 187N" which are nonionic in nature and "SAM 181A, 183A, 184A and 211A" which are anionic sulfates or sulfonates in nature by the Specialty Chemicals, Chemicals Group of PPG Industries, Inc. of Gurnee, Ill. The SAM monomers are said to be represented by the general structure:

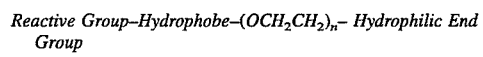

*Reactive Group–Hydrophobe–$(OCH_2CH_2)_n$– Hydrophilic End Group*

The nonionic SAM monomers are beige waxy solids provided as 100% active materials having HLB values of 6.9 (185N), 9.9(186N) and 14.0 (187N). Three of the anionic materials are provided as 30% active content liquids in water having HLB values of 23.1 (181A), 19.6 (183A), and 16.1 (184A) and each had a pH value of 7.2. The SAM 211A material is provided as a beige viscous liquid at 100% actives content having an HLB value of 43.8 with a pH of 7.3. The viscosity in centipoise (Pascal.seconds) for the SAM materials and the temperature at which the viscosity was measured were reported as follows: 185N: 247 (0.247) @50° C.; 186N: 277 (0.277) @ 50° C.; 187N: 170 (0.170) @60° C.; 181A: 45.1 (0.045) @50° C.; 183A: 60 (0.060)

@25° C.; 184A: 51 (0.051) @25° C.; and 2170 (2.170) @50° C. The melting points of the SAM materials reported by the manufacturer were as follows: 185N: 40° C.; 186N: 40° C.; 187N: 49° C.; and 211A: 40C.

Those skilled in the art will appreciate that the 1-alkenes can be used in the form of pure materials such as 1-decene or 1-octadecene or in the form of mixtures of various 1-alkenes. This is particularly true for the higher 1-alkenes where it is preferred for economic reasons to use mixtures of the higher 1-alkenes (i.e., those having more than about 20 carbon atoms per molecule—"$C_{20+}$1-alkenes"). For example, a mixture of $C_{30+}$1-alkenes of the type described in U.S. Pat. No. 3,553,177 to Hazen et al. (a mixture of even carbon number chain length 1-alkenes) or longer chain 1-alkenes having an average of about 48 carbon atoms per molecule as in U.S. Pat. No. 4,748,196 to Kuroda et al. (Preparation Example 1) may be used. Another mixture of higher 1-alkenes is a mixture of $C_{20}$ to $C_{24}$ 1-alkenes which is commercially available from Shell Chemical Company of Houston, Tex., or Chevron Corporation of Houston, Tex., or a mixture of $C_{24}$ to $C_{28}$ 1-alkenes available from Chevron Corporation. The 1-alkenes should be essentially monoolefinic because diolefins cause gel formation and crosslinking. Small amounts of diolefins, typically less than 2% by weight, can be tolerated as an impurity in the higher 1-alkene monomer.

More preferably, a combination of 1-alkenes is used to form what is sometimes loosely called a "terpolymer" based on the presence of three (and sometimes more) components in the polymer: the ethylene-1,2-dicarboxylic acid or anhydride and two types of 1-alkenes, one or both of the latter of which may be blends of 1-alkenes. Examples of such "terpolymers" composed of 49–60 mole percent of a maleic anhydride unit, 10–40 mole percent of a lower 1-alkene unit having from 4 to 16 carbon atoms and 40–10 mole percent of at least one higher 1-alkene unit having at least 18 carbon atoms and how they are made can be found in U.S. Pat. No. B14,358,573 to Verbrugge. U.S. Pat No. 4,871,823 to Billman et al. teaches addition polymers containing from about 55 to 95 mole percent of maleic anhydride units and from about 5 to 45 mole percent of units derived from 1-alkenes having at least 4 carbon atoms where the polymer may contain one or more 1-alkenes.

Copolymers and other addition polymers of ethylenically unsaturated monocarboxylic acids and ethylene-1,2-dicarboxylic acids or anhydrides are well-known in the art and are commercially available. Examples of the latter preferred polymers containing ethylene-1,2-dicarboxylic acids and anhydrides are shown by the Verbrugge and Billman et al. Patents noted above. Other examples of such polymers and method of their manufacture can be found in U.S. Pat. No. 3,461,108 (Heilman), U.S. Pat. Nos. 3,553,177 (Hazen) 3,560,455 (Hazen), 3,560,456 (Hazen), 3,560,457 (Hazen), U.S. Pat. No. 3,706,704 (Heilman) and U.S. Pat. No. 4,859,752 (Bosanec et al.). The manner by which such addition polymers are produced forms no part of the present invention.

The amount of 1-alkene present in the polymer ranges from about 2.5 to 50 mole percent, more preferably from about 25 to 50 mole percent, and most preferably, from about 40 to 50 mole percent of the addition polymer and the balance of the polymer is the ethylene-1,2-dicarboxylic acid or anhydride.

Terpolymers are presently preferred for use in the present invention. More preferred are an addition polymer of an ethylene-1,2-dicarboxylic acid or anhydride such as the most preferred maleic anhydride and (a) 1-decene with a $C_{20}$–$C_{24}$ 1-alkene blend, more preferably in a 40:60 to 60:40 mole ratio, and most preferably in a 50:50 mole ratio, or (b) 1octadecene with a $C_{24}$–$C_{28}$ 1-alkene blend, more preferably in a 90:10 to 10:90 mole ratio and most preferably in a 20:80 mole ratio.

Examples of polymers of acrylic or methacrylic acid and other comonomers which may be useful in the compositions of the present invention include a polymer of 85 mole percent lauryl acrylate and 15 mole percent acrylic acid, a polymer of 95 mole percent lauryl acrylate and 5 mole percent acrylic acid, a polymer of 85 mole percent of an acrylate ester of a blend of long chain monoalcohols having from about 27 to 35 carbon atoms per molecule sold by Petrolite Specialty Polymers Group, Petrolite Corporation of Tulsa, OK under the designation "X5100" and 15 mole percent acrylic acid, a terpolymer of 80 mole percent of an acrylate ester of a blend of long chain monoalcohols having from about 45 to 53 carbon atoms per molecule sold by Petrolite under the designation "X5113", 15 mole percent acrylic acid, and 5 mole percent of an acrylate ester of a blend of polyethoxylated long chain monoalcohols having from about 35 to 43 carbon atoms per molecule sold by Petrolite under the designation "X5139", a polymer of 60 mole percent lauryl acrylate, 20 mole percent of Petrolite® X5113 monomer, 15% methacrylic acid and 5 mole percent of an ethoxylated nonylphenol acrylate sold under the designation "CD-504" by Sartomer Company, Inc. of West Chester, Pa., and a polymer of 85 mole percent of Petrolite® X5113, 10 mole percent of acrylic acid and 5 mole percent of SAM 211A from PPG Industries.

As described in the Billman et al. Patent above, the addition polymers may be modified by esterification of the carboxyl groups or anhydride groups present with substituted or unsubstituted monoalcohols having alkyl groups of from 1 to about 48 carbon atoms per molecule to produce half esters. Examples of such unsubstituted alcohols are methanol, ethanol, amyl alcohol, n-butanol, 2-butanol, cyclohexanol, benzyl alcohol, 2-ethylhexanol, isobutanol, isopropanol, methyl amyl alcohol, tetrahydrofurfuryl alcohol, 1-dodecanol, 1-hexadecanol, iso-stearyl alcohol, 1-eicosanol, 1-docosanol, 1-triacontanol, 1-hexatriacontanol and 1-octatetracontanol. The alkyl chain in the monoalcohol can help with solubilization of the polymer in any fatty acid or else with subsequent solubilization of polymer/fatty acid compositions in heated aqueous nearly neutral to alkaline pH solutions during the repulping process. Other possible substituted monoalcohols are alkoxylated hydroxyethers such as those of the formula $AO(CH_2CH_2O)_a(C_3H_6O)_bOH$ where A is R-, $RC_6H_5$-, RCO-, phenyl or benzyl where R is an alkyl radical of from 1 to 30 carbon atoms, a and b are each integers of from 0 to 30 where either or both of a and b is equal to at least 1 such as propylene glycol monomethyl ether, ethylene glycol monobutyl ether, ethylene glycol monohexyl ether, propylene glycol monobutyl ether, and diethylene glycol monobutyl ether, polyethoxylated nonylphenol containing from about 1 to 20 ethoxy groups per molecule. Obviously, use of monoalcohols that will soften the composition of the present invention too much or make it too water sensitive to be acceptable at the temperature of use must be avoided so the composition remains intact during the useful life of the coated or impregnated article.

The substituted monoalcohols may contain further functional groups such as sulfonate groups which do not react with the carboxyl groups present in the polymer, but provide desirable properties to the polymers used in the compositions of the present invention. An example of one such functional monoalcohol is isethionic acid (oxyethyl sulfonic acid).

Similarly, substituted and unsubstituted monoaminofunctional compounds can be used to create amides and imides by reaction with the carboxyl groups present in the polymer. The substituted monoamino-functional compounds may contain further functional groups such as sulfonate groups that do not react with the carboxyl groups present in the polymer, but provide desirable properties to the polymers used in the compositions of the present invention. Examples of such unsubstituted amino-functional compounds are primary or secondary monoamines containing alkyl groups of from about 1 to about 30 carbon atoms per molecule such as methylamine, cyclohexylamine, isopropylamine, di-n-propyl amine, ethyl-n-butylamine, diamylamine, 2-ethylhexylamine, di(2-ethylhexyl)amine, n-octylamine, di-n-dodecylamine, n-octadecyl amine, di-n-decylamine, tallowamine, cocoamine, dicocoamine, oleylamine, and soyamine.

Examples of substituted monoamines with functional groups include compounds containing hydroxy, polyalkoxy or sulfonic acid groups in addition to amine groups and alkyl groups of from about 1 to about 30 carbon atoms such as taurine (aminoethyl sulfonic acid), n-methyl taurine, morpholine, and di(hydrogenated-tallow)amine, . Further examples are polyalkoxylated ether amines of the formula $DO(CH_2CH(CH_3)O)_c(CH_2CH_2O)_dCH_2CH(CH_3)NH_2$ where D is an alkyl group of from 1 to about 12 and each of c and d can be 0 to about 32 where the total of c+d is from about 2 to 50 sold commercially under the trademark JEFFAMINE® by Texaco Chemical Company of Austin, Tex. such as JEFFAMINE® M-1000 where D is $CH_{30}$-, and the ratio of c:d is 3:18 and the molecular weight is about 1000. Yet other examples of such monoamines with functional groups are the reaction products of aldehydes or ketones with bisulfite to produce an hydroxylamine followed by reaction of that hydroxylamine with a primary amine having from about 1 to about 20 carbon atoms to obtain a compound of the general formula $R^1NHCR^2R^3SO_3X$ where $R^1$ is an alkyl group of 1 to 20 carbons, and $R^2$ and $R^3$ are each hydrogen or alkyl groups of from about 1 to 4 carbons.

Commercial repulping operators prefer to use repulping solutions that are as near to being neutral or slightly alkaline in pH as possible (approximately 7.1 to about 8.5). It was found that by modifying the polymer with organo-functional compounds, monoamines or monoalcohols such as taurine provide compositions of the present invention that are water-resistant at the normal temperatures of use for coated paper products. However, compositions of the present invention that contain such modified polymers provide coated fibrous products that can be repulped in nearly neutral to slightly alkaline aqueous media at about or above 50° C. (depending upon the melting point of the fatty acid and other ingredients in the coating composition) which is a significant advantage.

To provide such modified polymers, the polymers are subsequently modified by reacting from about 1 mole percent to about 90 mole percent, more preferably from about 5 mole percent to about 50 mole percent, and most preferably from about 10 mole percent to about 30 mole percent, of the total moles of carboxyl groups in the polymer with a monoalcohol or monoamine of the type described above. Only enough monoalcohol or monoamine is used to leave sufficient carboxyl groups to provide sensitivity to water to make the coated or impregnated fibrous products repulpable in heated slightly alkaline to nearly neutral pH aqueous media while still keeping the overall hot melt polymer/fatty acid composition sufficiently water-resistant at the temperature of use.

The preparation of such modified polymers is well known in the art and forms no part of the present invention. For example, the preparation of taurine-modified polymers is described in U.S. Pat. No. 3,991,079 to Hoke, U.S. Pat. No. 4,317,893 to Chen et al., U.S. Pat. No. 4,588,786 to Kadono, and U.S. Pat. No. 4,618,450 to Higgins. Another method that can be used is the reaction of taurine with a maleic anhydride polymer of the type described above in the presence of about 1–2 moles of water per mole of anhydride group at about 150° C. in a pressurized reactor to induce opening of and reaction with the anhydride ring.

Use of more than about 50% by weight of polymer in the compositions of the present invention results in a very viscous composition at temperatures between 50° C. and 130° C. that are not commercially desirable for use as hot melt coating compositions.

The second required ingredient is from 50% to about 95%, more preferably from about 70% to 90%, and most preferably, from about 75% to 90% by weight based upon the total weight of hot melt polymer/fatty acid composition of at least one fatty acid selected from the group consisting of natural or synthetic fatty acids containing from about 12 to 48 carbon atoms. The fatty acid should be a solid at the expected temperature of use of the composition and contributes to the water repellency of the hot melt polymer/fatty acid composition. However, in alkaline media, a water-dispersible soap is formed when the carboxyl group present in the fatty acid is neutralized and becomes hydrophilic. The resulting soap then assists in removing and dispersing the polymer from the fibers during the repulping process. Best repulpability was obtained using a combination of a fatty acid such as stearic acid with the above-described polymers. Use of too much fatty acid can have adverse effects on the composition by making the coated article turn cloudy initially or when placed in contact with water and may lead to poor adhesion of the composition to the fibrous product such as paper being coated. Use of too much fatty acid can also increase foaming during repulping and increase the cost of the composition.

Other optional ingredients that may be present at about 5% by weight or less of the total composition include the pigments, preservatives, dyes, stress-cracking reduction agents such as ethylene-vinyl acetate copolymers, and other conventional additives commonly found in hot melt compositions for fibrous products.

INDUSTRIAL APPLICABILITY

The compositions of the present invention are simple to produce. The polymer and fatty acid to be used are charged to a mixing vessel equipped with a stirrer and heated to a temperature above the melting point of the highest melting ingredient, typically from about 75° C. to about 130° C., but less than that temperature at which the ingredients thermally degrade. Stirring is started when the ingredients are sufficiently fluid to permit stirring. The temperature is maintained and stirring is continued until the mixture is homogeneous. Other conventional optional ingredients may be added to the fluid mixture as is commonly done for hot melt coating compositions. When the mixture is homogeneous, it is then cooled and placed in a lined drum or pail for storage prior to use. The composition also can be maintained in a fluid state with continued heating for shipment or use shortly after preparation.

The hot melt polymer/fatty acid compositions are applied using the same type of coating equipment as is conventionally used for hot melt wax coatings for paper-based products. This is one of the advantages of the compositions of the present invention.

For example, the compositions of the present invention may be heated until the composition is sufficiently fluid to be coated such as from about 50° C. to 130° C. for curtain coating. For example, the composition is added to a reservoir in a conventional cascade coating machine for corrugated paper boxes that are placed on a moving conveyor belt in flat sheets form with their flutes (open ends) facing up. A cascade or wall of molten coating composition is flowed over the tops of the sheets so the fluid composition coats all sides of the sheets and also flows to some degree within the corrugations forming the interior of the corrugated paperboard sheets. After passing through the cascade of molten hot melt polymer/fatty acid composition, the corrugated paperboard sheets pass through a cooler area while air is circulated around the coated sheets to cool the composition below its melting point and create a solid coating on the sheets. The coated sheets are then removed from the conveyor belt and stacked for assembly into corrugated paperboard shipping boxes. The remaining hot melt polymer/fatty acid composition is captured after it passes over the sheets and is recirculated back over new sheets to form a continuous cascade coating process. Curtain coating machinery can also be used. Another alternative dip coating method for hot melt coatings is described in U.S. Pat. No. 4,668,536 to Goodell et al. noted above. Commercial coaters typically desire to have from about 30% to 80% coating pickup on the products being coated.

After use, the coated paper products can then be repulped essentially using conventional paper product repulping equipment and techniques involving the use of heated aqueous nearly neutral to alkaline pH repulping conditions. An inorganic or organic base such as sodium hydroxide, sodium carbonate, sodium bicarbonate, ammonia, disodium phosphate, borax and organic amines such as triethanolamine, isopropylamine or triethylamine may be used to provide alkalinity to the aqueous solution used in the repulping process with sodium hydroxide, sodium carbonate, sodium bicarbonate, and mixtures thereof being preferred. Bases having buffering capacity such as sodium carbonate and sodium bicarbonate are more preferred. The pH of the repulping media needed depends upon (a) the type and amount of base used, and (b) the type of hot melt polymer/fatty acid composition of the present invention used. The advantage of using a base with buffering capacity is that the pH of the solution tends to remain relatively constant as long as the amount of base present is in excess of that required for neutralization of any acid or carboxyl groups present. As is well known, for bases with buffering capacity, the pH is characteristic of that particular base. For example, the pH of aqueous sodium carbonate is about 10–10.5 whereas that for aqueous sodium bicarbonate is about pH 8–8.5. Because of its lower pH value in solution, sodium bicarbonate tends to be less damaging to paper fibers than sodium carbonate, but the latter is a more cost effective base to use.

Polymers having shorter alkyl chain length monomers tend to have more solubility in water at lower levels of neutralization of the carboxyl groups present and can thus be repulped in lower pH (approximately 7.5 to 8.5) aqueous solutions. Modified polymers containing functional monoamines such as taurine reacted with some of the carboxyl groups present tend to be repulpable at pH values closer to 7 using deionized water than coating compositions based upon unmodified polymers. Some amount of neutralization is required to activate the carboxyl groups in the polymer and in the fatty acid present in the hot melt polymer/fatty acid composition to separate the coating from the paper fibers.

Similarly, products made by using the compositions of the present invention can be used as impregnating agents or binders to bind cellulosic fibers together by heating mixtures of the fibers and coating together to form molded products such as cartons and containers after cooling. Such cartons or containers can later be repulped in the same manner as described above for coated paper products.

Further information concerning other hot melt coatings and their evaluations can be found in a copending patent application which is being filed concurrently herewith and assigned to the same Assignee as is the present invention: U.S. patent application entitled "Repulpable Hot Melt Polymer/Wax Compositions For Fibrous Products" filed Jul. 22, 1993, as U.S. Ser. No. 08/096,133 in the names of Paul E. Sandvick and Calvin J. Verbrugge, the same inventors as are named herein.

The following Examples are provided to show various aspects of the present invention without departing from the scope and spirit of the invention. Unless otherwise indicated, as with the polymers where the percentages of monomers used are expressed in mole percent, all other parts and percentages used in the following Examples are by weight. In the Examples, times are described where 3' means 3 minutes and 20" means 20 seconds; measurements are described where 5 in means 5 inches, 2 cm means 2 centimeters and 6 mm means 6 millimeters; weights are described where 10 g means 10 grams and volumes are described where 7 ml means 7 milliliters and 16 oz means 16 fluid ounces. "Room temperature" is about 20° C.

Various ways of evaluating the water resistance of coated paper products have been developed. Sometimes the term "water repellency" is also used. For the purposes of this invention, "water-resistant" or "water-resistant coatings or compositions" shall mean a composition used as a coating which provides a fully-coated or impregnated fibrous product with sufficient resistance to water that the fibrous product's physical properties such as physical strength and fiber integrity are not significantly degraded after immersion in ice water (0° C.) for a one hour period. One measurement is to calculate the percent coated fibrous product sample weight change after immersion in ice water (0° C.) for a one hour period by weighing the coated fibrous product sample before and after coating, then weighing the coated fibrous product sample after immersion in water, calculating the difference in coated fibrous product sample weight before and after immersion, and dividing that difference by the uncoated fibrous product sample weight, and multiplying by 100 to get a percent weight change ("WATER IMMERSION TEST"). A desirable value of water absorption or weight gain by the WATER IMMERSION TEST is no more than about 10%, since above this value, the paper strength begins to deteriorate noticeably.

One measure of water-resistance, which is not as stringent as the one hour immersion in ice water test is to simply place a drop of water on the surface of a coated paper article. This test was also used to evaluate the water sensitivity of repulped paper samples using the REPULPABILITY METHOD described below. The initial contact angle at room temperature of the water droplet is noted and the droplet is observed over a period of time. If the droplet was completely absorbed into the paper sample within a few seconds, that observation and the time it took to be absorbed was reported.

If the droplet was not absorbed quickly, a visual rating scale was used to describe the contact angle of the water droplet. A rating of "High" or "H" contact angle indicated that the droplet had a somewhat spherical shape when viewed from the side and its height was more than about one-half the height of a water droplet of the same volume on a completely water-resistant, hydrophobic surface. A rating of "Medium" or "M" contact angle was assigned where the droplet tended to spread out over the surface, but still retained a visibly hemispherical shape when viewed from the side and had a height almost about one half of the height of a water droplet of the same volume on a completely water-resistant, hydrophobic surface. A rating of "Low" or "L" contact angle was assigned where the droplet was not completely absorbed into the paper sample, but had essentially wetted the surface and had spread over the surface so the height of the droplet was less than about one-quarter of the height of a water droplet of the same volume on a completely water-resistant, hydrophobic surface ("WATER CONTACT ANGLE").

Various tests for measuring the repulpability of paper products exist. Some methods use high shear-type kitchen blenders which may not reproduce the conditions used in commercial repulping equipment. To try to duplicate more closely the conditions used in commercial repulping operations, the following procedure was used in some of the Examples as noted (hereinafter "REPULPING METHOD") with some modifications as to pH and the nature of the aqueous repulping solution as noted in the Examples.

The REPULPING METHOD uses samples of uncoated 3 in by 6 in (7.62 cm by 15.24 cm) 69 pound (31.3 kilogram) Kraft paper liner board (i.e., 69 pounds per 1000 square feet or 31.3 kilograms per 92.9 square meters) of about 0.02 in (0.05 cm) thickness weighing about 4 g ("PAPER BOARD") which is dip-coated in the molten hot melt polymer/fatty acid composition to provide approximately 30–80% coating pickup weight if possible. The aqueous solution used for repulping is a 0.025 Molar ("0.025M") solution of sodium carbonate (anhydrous, 2.65 g per liter) at a pH of about 10.4 ("aqueous sodium carbonate solution").

The REPULPING METHOD involves the following steps:

1. Heat the aqueous sodium carbonate solution to 75° C.

2. The coated paper liner board sample is cut into chips measuring about 0.5 in by 0.5 in (1.27 cm by 1.27 cm).

3. The chips are added to 100 g of the heated sodium carbonate solution and mixed using a hand-held kitchen blender having a two-bladed propeller-type stirrer with blunt, non-cutting edges. Mixing is continued until the pulp in the mixture becomes uniform (usually in about two minutes). At this point, the mixture now contains about 4% paper fiber content.

4. Dilute the aqueous pulp from step 3 to 400 g with 75° C. aqueous sodium carbonate solution and mix an additional 30" with the hand-held blender while the temperature of the mixture is at 70°–75° C. The mixture now contains about 1% paper fiber content.

5. The mixture is then suction-filtered using a porcelain Buchner funnel containing a 60 mesh (U.S. Standard) stainless steel screen in place of filter paper. The aqueous filtrate is retained and the pH of the filtrate is recorded.

6. The pulp filter cake remaining on the screen in the Buchner funnel (weight approximately 15–19 g) is removed and diluted to 400 g using 75° C. aqueous sodium carbonate solution of the type described above and mixed for 15" with the hand-held mixer at 70°–75° C.

7. Step 5 is repeated again. The aqueous filtrate is retained and the pH of the filtrate is recorded.

8. The pulp filter cake remaining on the screen in the Buchner funnel (weight approximately 15–19 g) is removed and diluted to 400 g using deionized water at room temperature and mixed for 15" with the hand-held mixer.

9. One hundred grams of the aqueous pulp from step 8 is diluted to 300 g with deionized water at room temperature and mixed for 15" with the hand-held mixer. This mixture contains about 0.3% paper fiber content. The remaining paper pulp from step 8 is also retained separately.

10. The diluted paper pulp mixture from step 9 is filtered onto a screen as in step 5 to form a paper sheet. Suction is not started until after the pulp mixture has all been poured into the funnel. The aqueous filtrate is retained and its pH is recorded.

11. With the paper sheet still attached to the screen, the screen is removed from the Buchner funnel. A second screen of the same type is placed on top of the paper sheet. The screen/paper/screen assembly is placed between two paper towels.

12. A 1000 ml stainless steel metal beaker is used as a roller to squeeze the water from the screen/paper/screen assembly into the towels. This process is repeated until all excess water is removed.

13. The paper sheet is left attached to one of the screens and placed, screen side down, on a 16 oz (473 ml) metal jar lid placed on a hot plate at a setting of 3 (Corning® hot plate model no. PC-35, 600 watts). Alternatively, the paper sheet may be dried on the screen in an oven for 30' at 80° C. or as otherwise indicated in the following Examples. The drying method was found to affect the water sensitivity and permeability of the resulting paper sheet.

To test the water sensitivity of the paper sheet, a droplet of water is placed on the paper sheet obtained above. The time for the droplet of water to completely soak into the paper sheet is measured a total of two to twenty times. The average of the measurements is reported. If any one or more droplets take more than 25', then the observation is discontinued and the result is simply reported as greater than 25' ("WATER SOAK-IN TIME").

The efficiency of repulpability was measured by diluting 50 ml of aqueous pulp from Step 8 above to 500 ml with deionized water in a graduate cylinder. The mixture is swirled and visually observed for the presence of flakes of unpulped paper using a scale of none, slight, moderate, considerable and heavy ("REPULPABILITY EFFICIENCY").

The molecular weights of the polymers described below were determined by a high pressure liquid chromatographic method using polystyrene molecular weight standards to measure the number average molecular weight ("$M_n$") in daltons the weight average molecular weight ("$M_w$") in daltons, the Z-average molecular weight ("$M_z$") in daltons, and viscosity average molecular weight ("$M_v$") in daltons.

The Following Ingredients Were Used in the Examples

POLYMER A

An addition polymer of maleic anhydride and a mixture of 1-alkenes in about a 50:50 molar ratio of maleic anhydride to 1-alkenes where the 1-alkenes used were a blend of 50 mole percent of 1-decene and 50 mole percent of $C_{24}$–$C_{28}$ 1-alkenes. The molecular weight values of Polymer A were: $M_n$- 3,090 daltons; $M_w$- 12,280 daltons; $M_z$- 27,260 daltons and $M_v$ - 10,910 daltons.

POLYMER B

An addition polymer of maleic anhydride and a mixture of 1-alkenes in about a 50:50 molar ratio of maleic anhydride to 1-alkenes was prepared where the 1-alkenes used were a blend of 20 mole percent of 1-octadecene and 80 mole percent of 1-alkenes having substantially from about 24 to 28 carbon atoms per molecule. The molecular weight values obtained for a batch of one such polymer were: $M_n$- 2,707 daltons; $M_w$- 17,230 daltons; $M_z$- 68,330 daltons and $M_v$- 13,920 daltons. A polymer of this composition was modified by heating the polymer, a sufficient amount of taurine to react with 10 mole percent of the anhydride groups present in the polymer, and 1 mole equivalent of water (based upon the total moles of maleic anhydride) to the mixture in a pressurized reactor to 150° C. with stirring and allowing the taurine to react with the carboxyl groups present in the polymer until a considerable portion of the taurine was reacted (90', 75 p.s.i.g. (0.52 megaPascal)).

In the Examples below, the stearic acid was EMERSOL® 132 from Henkel Corp./Emery Division of Cincinnati, Oh. Likewise, in the Examples, "PARAFFIN A" was paraffin wax with a melting point between 51° C. and 53° C.

It should be noted that the hydrophilicity of the repulped paper or fibrous article is not the only criteria for evaluating the repulpability of the coated products. While hydrophilicity is desirable, good repulpability exists if (1) good fiber separation is obtained in the pulp with little or no evidence of unpulped paper flakes remaining, (2) there is little or no tendency of the separated fibers to clump together in the diluted pulp, (3) paper formed is uniform and clean in appearance with little evidence of greasy or oily spots and imperfections due to unrepulped flakes, and (4) the equipment used to conduct repulping is reasonably free of insoluble deposits of the composition used to coat the articles being repulped. For example, repulped fibrous articles which are hydrophobic on the surface could still be used in making articles where some water resistance is desirable.

EXAMPLES 1–4

These comparative Examples illustrate various coating compositions as described in Table I as well as an uncoated PAPER BOARD included as a control (Example 1). Each of Examples 2–4 was melted to dip coat both sides of PAPER BOARDS in a 70°–75° C. bath of the composition ("DIP COATING").

The uncoated PAPER BOARDS of Example 1 and the coated PAPER BOARDS of Example 2 were subjected to the REPULPING METHOD. During the repulping process, the pH of the filtrate for Examples 1 and 2 averaged between 10 and 11 for each of the three wash (repulping) solutions. The water resistance of paper made from the repulped coated PAPER BOARDS was measured by the water drop method after drying on a hot plate as described above and is reported in Table II.

Comparative Example 3 involved coating PAPER BOARDS with a coating consisting only of POLYMER B without any fatty acid added. Due to high viscosity at 115° C., the original coating pickup for 100% POLYMER B was unacceptably high. Thus, 2.8 g of POLYMER B was dissolved in 10 g of heptane and coated onto a heptane soaked PAPER BOARD to permit water resistance and repulpability to be measured on a PAPER BOARD with a lower coating pickup. This illustrates a disadvantage of attempting to use 100% polymer as a water-resistant coating to be applied at temperatures commonly used to hot melt coat fibrous products such as paper.

The coated PAPER BOARDS of Example 3 were subjected to the REPULPING METHOD and the pH values for the three wash (repulping) solutions used were 10.4, 11.0, and 10.3, respectively. Table II reports the WATER CONTACT ANGLE and WATER SOAK-IN TIME of the repulped papers obtained after drying at three different periods of time at three different temperatures ("A" "B" and "C" samples) to determine the effect of drying time and temperature on the hydrophilicity of the repulped paper.

Comparative Example 4 involved the use of 100% stearic acid as a hot melt coating composition on PAPER BOARDS. The coated PAPER BOARDS of Example 4 were repulped according to the REPULPING METHOD, but 2.65 g of sodium bicarbonate per liter of water was used in place of the sodium carbonate specified in the REPULPING METHOD. Table II reports the WATER CONTACT ANGLE and WATER SOAK-IN TIME of the repulped papers obtained after drying at two different periods of time at two different temperatures ("A" and "B" samples) to determine the effect of drying time and temperature on the hydrophilicity of the repulped paper.

TABLE I

| Ex. | PARAFFIN A (%) | Stearic Acid (%) | POLYMER B (%) | Coating Pickup[1] (%) |
|---|---|---|---|---|
| 1 | 0 | 0 | 0 | No Coating |
| 2 | 100 | 0 | 0 | 52.5 |
| 3 | 0 | 0 | 100 | 33.1[2] |
| 4 | 0 | 100 | 0 | 65.0 |

1. In this and the following Tables, percentage weight increase of a sample of PAPER BOARD (described above) after coating, i.e., coated weight minus the initial weight of the PAPER BOARD, all divided by the initial weight of the PAPER BOARD and multiplied by 100.

2. Coated from a solvent solution as described above.

TABLE II

| Ex. | Weight of Repulped Paper (g) | Dry Time (min) | Drying Temp. (°C.) | WATER CONTACT ANGLE[1] | WATER SOAK-IN TIME[1] |
|---|---|---|---|---|---|
| 1 | 0.83 | (2) | (2) | None | Immediately absorbed |
| 2 | 0.86 | (2) | (2) | H | >25' |
| 3A | 0.86 | ~16 hr | R.T. | M | 8" |
| 3B | 0.80 | 45 | 40 | M | 7.5" |
| 3C | 0.74 | 30 | 80 | 5-M; 1-L | 185" |
| 4A | 0.94 | 45 | 40 | L | 5" |
| 4B | 0.71 | 30 | 80 | L | 45" |

R.T. = Room Temperature

1. The parenthetical reports the water contact angle as H = high; M =medium and L =low. The time values reported are an average of at least two and up to seven measurements.

2. Drying done on a hot plate as described above.

For Example 1, the WATER IMMERSION TEST results for uncoated PAPER BOARD were 66.1% and 78%, respectively, in weight gain for the two samples tested.

The PAPER BOARD samples coated with Example 2 rendered the PAPER BOARD hydrophobic and resistant to water. Example 2 is an example of a conventional hot melt wax coating. The WATER IMMERSION TEST was not run on Example 2.

Example 3 was deemed to be a water-resistant coating although the WATER IMMERSION TEST was not run on Example 3.

Example 4 gave an unacceptable WATER IMMERSION TEST weight gain value of 33.3% indicating that Example 4 was unacceptable for use as a paper article coating where the paper is to come in contact with water. The coating from Example 4 was initially very crystalline and not very white in appearance. After the WATER IMMERSION TEST, the coating remained very crystalline and undesirably became very white in appearance.

REPULPABILITY EFFICIENCY

No unpulped paper flakes were noted in Examples 1 or 2. The presence of unpulped paper flakes in Examples 3 and 4 was not evaluated.

It was believed that very little hydrophobic material was present in the repulped paper samples coated with compositions of the present invention. This is based upon measurements done on repulped papers using repulpable coatings of somewhat similar compositions in the copending patent application entitled "Repulpable Hot Melt Polymer/Wax Compositions For Fibrous Products" noted earlier. It was thought that drying at high temperature, especially on a hot plate, might cause any hydrophobic material present to melt and bloom to the surface or spread over the entire repulped paper sample and give the paper surface a more hydrophobic appearance than it actually possesses. The hot plate drying method is not one which is used commercially, but is sometimes used for laboratory evaluation of conventional paper samples which had not been rendered water-resistant. However, conventional hot melt wax compositions are not considered repulpable. Thus, repulped papers from compositions of the present invention may not lend themselves to evaluations using conventional laboratory methods developed for repulped papers made from hydrophilic, uncoated paper samples. This premise is supported by the results observed in Examples 3A–3C and 4A–4B where different drying times and temperatures affected the WATER SOAK-IN TIME observed. Higher drying temperatures tended to produce paper samples that exhibited higher water contact angles and longer water soak-in times in spite of the low amount of hydrophobic material in the coating composition. This effect should be kept in mind in evaluating the Examples herein.

It is believed that repulped paper samples made from paper products coated with compositions of the present invention could be used satisfactorily for production of recycled paper products such as corrugated paper boxes under suitable drying conditions.

EXAMPLES 5–8

These Examples demonstrate the use of various levels of POLYMER A in compositions of the present invention. Table III reports the compositions used and the coating pickup on the PAPER BOARD using DIP COATING (two samples of each were coated and designated "A" and "B"). Examples 5, 6 and 8 were prepared and evaluated at the same time while Example 7 was prepared and evaluated at a different time. The results of the WATER IMMERSION TEST run on the "B" samples are also reported in Table III.

TABLE III

| Ex. | Stearic Acid (%) | POLYMER A (%) | Coating Pickup (%) | WATER IMMERSION TEST (%) |
|---|---|---|---|---|
| 5A | 95 | 5 | 63.0 | — |
| 5B | 95 | 5 | 64.9 | 6.5 |
| 6A | 90 | 10 | 66.5 | — |
| 6B | 90 | 10 | 67.8 | 2.5 |
| 7A | 75 | 25 | 64.7 | — |
| 7B | 75 | 25 | 64.6 | 3.4 |
| 8A | 50 | 50 | 143.9 | — |
| 8B | 50 | 50 | 145.5 | 0.2 |

Based on the WATER IMMERSION TEST values of weight gain for pickup of water, Example 5 is marginally acceptable with a 6.5% gain in weight while the water gain decreases with increasing levels of polymer. However, this is offset by the fact that the viscosity of the coating composition at a given coating temperature also increases with increasing levels of polymer. DIP COATING Example 8 gave high coating pickup values because the composition was quite viscous at the coating temperature of 70°–75° C.

Prior to the WATER IMMERSION TEST, the coating of Example 5B had a shiny, rough, and mottled appearance with white spots. Very little change in Example 5B was observed immediately after the WATER IMMERSION TEST except a little more whitening of the coating was noted.

Prior to the WATER IMMERSION TEST, the coating of Example 6B was a little less shiny than Example 5B and had a rough and mottled appearance with white spots. Very little change in Example 6B was observed immediately after the WATER IMMERSION TEST except a little more whitening of the coating was noted.

Prior to the WATER IMMERSION TEST, the coated PAPER BOARD of Example 7B had a uniform, dark appearance. Example 7B became mottled with regionally lighter-colored patches immediately after the WATER IMMERSION TEST.

Prior to the WATER IMMERSION TEST, the coating of Example 8B was smooth, free of whiteness except for coating clinging to the bottom of the coated PAPER BOARD where the coating had run down during cooling, and was not shiny. No change was observed in Example 8B immediately after the WATER IMMERSION TEST.

Immediately after the WATER IMMERSION TEST, the coating on Example 8B cracked when the coated PAPER BOARD was bent while Examples 5B and 6B did not crack and only whitened on severe bending.

Table IV reports the results of subjecting the "A" series of coated PAPER BOARDS described in Table III to the REPULPING METHOD, except a wash (repulping) solution of 4.2 g of sodium bicarbonate per liter of water was used for Examples 5A, 6A and 8A and the repulping was done using 65° C. wash solutions instead of the 75° C. temperature stated in the REPULPING METHOD. The pH values for the first wash (repulping) solution used in the REPULPING METHOD for these Examples was between 7.12 and 7.74. Two sheets of paper were made from each Example and are designated "C" and "D".

Example 7 was repulped according to the REPULPING METHOD. The pH values for the three wash solutions were 9.15, 10.25 and 8.95, respectively. Only one sheet of repulped paper was made and evaluated as Example 7C.

TABLE IV

| Ex. | Weight of Paper (g) | Dry Time (min) | Drying Temp. (°C.) | WATER CONTACT ANGLE | WATER SOAK-IN TIME |
| --- | --- | --- | --- | --- | --- |
| 5C | NR | 30 | 80 | L to M[1] | 12' |
| 5D | NR | 30 | 80 | L to M[1] | 12' |
| 6C | NR | 30 | 80 | L to M | 4' |
| 6D | NR | 30 | 80 | L to M | 6' |
| 7C | 0.93 | (2) | (2) | Very Low | Less Than 2" |
| 8C | NR | ~16 hr | 80 | M | >25' |
| 8D | NR | ~16 hr | 80 | M | >25' |

"NR" - Not Recorded

1. The droplet spread out more on soaking into the PAPER BOARD than observed for Examples 6 and 8.

2. Drying done on a hot plate as described above.

During the repulping of Examples 5C and 5D, thick foaming was observed, but the pulp mixed well with water. REPULPABILITY EFFICIENCY: unpulped paper flakes having a wide range of sizes were observed in a slight to medium amount. No residue of scum was left on the mixer.

Examples 6C and 6D repulped in essentially the same fashion and with essentially the same results observed for Examples 5C and 5D above, but had slightly less foam and the coated PAPER BOARD was slightly easier to repulp.

An extensive amount of foam was noted for Example 7C prior to the first wash. To remove some of the foam, the filter cake of pulp from Example 7C was washed with about 10 to 25 grams of deionized water after the first and second washes.

Examples 8C and 8D foamed during repulping, but were characterized as being more viscous and very creamy rather than foamy. The "foam" was not expansive, but thick, and caused some problems during the first filtration where the product clogged up the filter. The filter cake was hard to remove and the paper handsheets very slightly adhered to the screen. Otherwise, the repulpability characteristics were similar to those observed for Examples 6C and 6D. No insoluble residues adhered to the repulping equipment. Some "foam" was left on equipment such as beakers. The "foam" was not sticky and rinsed off with water.

Examples 5 and 8 left the repulped paper with the most hydrophobic surfaces although Example 8 was dried for a rather long time in an 80° C. oven before being evaluated. Repulped paper from Example 6 was reasonably hydrophilic. Example 7, repulped under higher pH conditions than the other Examples in this series, was very hydrophilic. Some foaming was noted for these compositions since each contained at least 50% of stearic acid which was presumably turned into sodium stearate soap during the repulping process.

EXAMPLES 9–10

In these two Examples, the repulping of PAPER BOARDS coated with the compositions of Examples 7 and 8 above was again repeated. The experiments were run side-by-side using 0.025M aqueous sodium bicarbonate (4.2 g of sodium bicarbonate per liter of deionized water) as the repulping wash medium. Example 9 corresponds to the composition of Example 7 and Example 10 corresponds to the composition of Example 8.

Two PAPER BOARDS for Example 9 were coated by DIP COATING and each had a coating pickup of 77.3%. The first PAPER BOARD for Example 10 was coated by DIP COATING and had a coating pickup of 141.2% even though the coating did not completely cover the PAPER BOARD. The second PAPER BOARD for Example 10 was coated by DIP COATING at 80° C. and had a coating pickup of 132.5%.

Each coated PAPER BOARD was subjected to the REPULPING PROCESS, but using the 0.025M aqueous sodium bicarbonate solution noted above and the repulping was conducted at 65° C. The pH of the first repulping wash solution filtrate was 7.47 for Examples 9A and 9B and 7.37 for Examples 10A and 10B. The results are summarized in Table V below.

TABLE V

| Ex. | Dry Time (min) | Drying Temp. (°C.) | WATER CONTACT ANGLE | WATER SOAK-IN TIME |
| --- | --- | --- | --- | --- |
| 9A | 30 | 80 | L to M[1] | 24' to >25'[1] |
| 9B | 30 | 80 | L to M[1] | 9', 20" to >25'[1] |
| 10A | 30 | 80 | M | >25' |
| 10B | 30 | 80 | M | >25' |

1. Range of highest and lowest values for total of five spots measured.

During the repulping of Examples 9A and 9B, a significant amount of very viscous foam was noted. Dispersibility of the pulp was good throughout the procedure. Some swirling of the pulp was required to make the repulped paper handsheet from Example 9B. The blender equipment was essentially clean and free of scum. Some flakes of what might have been unrepulped paper were noted after dilution of the pulp with water, but these were very fine in nature and might have been tiny bubbles from the foam. The repulping process slowed down after the foam began to form and the last pieces of the coated PAPER BOARD were harder to digest. The repulpability of these samples was judged to be moderate. In the REPULPABILITY EFFICIENCY test, moderate flakes of unpulped paper were observed, but some were very large. The diluted pulp tended to settle to the bottom of the container. No sticking of the paper handsheets to the screen was noted.

During the repulping of Examples 10A and 10B, a very large amount of foam was noted having the consistency of runny shaving cream which almost clogged the filter. The dispersibility of the pulp was judged to be good. In REPULPABILITY EFFICIENCY, these samples were judged almost the same as for Example 9, but the flakes were slightly smaller in size. A negligible amount of deposits were found on the repulping equipment. The repulped paper handsheets did not stick to the screen. Pulp diluted with deionized water (REPULPABILITY EFFICIENCY test) tended to settle to the bottom of the container to the same extent noted for Example 9. After several days, diluted pulp from both Examples 9 and 10 tended to form a silt-like deposit on the bottom of the container.

The presence of greasy or oily spots was noted on each of the repulped paper samples.

That which is claimed is:

1. A hot melt polymer/fatty acid composition that is dispersible in a heated nearly neutral to alkaline aqueous pH medium consisting essentially of
   A. from about 5% to 50% by weight based upon the total weight of the composition of at least one addition polymer selected from the group consisting of
      (i) a polymer of from about 5 to 95 mole percent of at least one ethylenically unsaturated monocarboxylic acid monomer containing a free carboxyl group and from about 5 to 95 mole percent of at least one additional ethylenically unsaturated monomer, (ii) a polymer of from about 50 to 95 mole percent of at least one ethylenically-unsaturated dicarboxylic acid monomer selected from the group consisting of an ethylene-1,2-dicarboxylic acid containing two free carboxyl groups and an ethylene 1,2-dicarboxylic acid anhydride having two carboxyl groups in the form of an anhydride group, and from about 5 to 50 mole percent of at least one additional ethylenically unsaturated monomer, and (iii) a polymer of a total of from about 5 to 95 mole percent of (a) at least one of the ethylenically unsaturated monocarboxylic acid monomers and (b) at least one of the ethylenically-unsaturated dicarboxylic monomers and from about 5 to 95 mole percent of at least one additional ethylenically unsaturated monomer, wherein the additional ethylenically unsaturated monomer is selected from the group consisting of 1-alkenes having from about 4 to 60 carbon atoms; alkyl vinyl ethers having an ether alkyl group of from about 8 to 60 carbon atoms, and alkyl acrylates or alkyl methacrylates having an alkyl group of from about 8 to 60 carbon atoms, and B. from about 50% to 95% by weight based upon the total weight of the composition of at least one fatty acid selected from the group consisting of natural or synthetic fatty acids containing from about 12 to 48 carbon atoms, wherein the fatty acid is compatible with the polymer and wherein the composition is a solid at 20° C., but starts to become fluid between about 50° C. and 95° C.

2. The composition as claimed in claim 1 wherein the polymer is an addition polymer of from about 50 to 95 mole percent of an ethylene-1,2-dicarboxylic acid or an ethylene-1,2-dicarboxylic acid anhydride and from about 5 to 50 mole percent of at least one unsaturated monomer selected from the group consisting of 1-alkenes having from about 4 to 60 carbon atoms.

3. The composition as claimed in claim 2 wherein the unsaturated monomer in the polymer is selected from the group consisting of 1-alkenes having from about 10 to 28 carbon atoms.

4. The composition as claimed in claim 2 wherein from about 1 mole percent to 90 mole percent of the total carboxyl groups contributed to the polymer by the monocarboxylic acid monomer or by the dicarboxylic acid monomer are reacted with compounds selected from the group consisting of substituted or unsubstituted alcohols having alkyl groups of from about 1 to 48 carbon atoms and substituted or unsubstituted primary or secondary amines having alkyl groups of from about 1 to 30 carbon atoms.

5. The composition as claimed in claim 2 wherein the fatty acid is selected from the group consisting of fatty acids having from about 16 to 22 carbon atoms.

6. The composition as claimed in claim 1 comprising from about 10% to 30% of the polymer and from about 70% to 90% of the fatty acid.

7. The composition as claimed in claim 1 comprising from about 10% to 25% of the polymer and from about 75% to 90% of the fatty acid.

8. The composition as claimed in claim 2 comprising from about 10% to 30% of the polymer and from about 70% to 90% of the fatty acid.

9. The composition as claimed in claim 2 comprising from about 10% to 25% of the polymer and from about 75% to 90% of the fatty acid.

10. The composition as claimed in claim 3 wherein the composition comprises from about 10% to 25% of the polymer and from about 75% to 90% of the fatty acid and the fatty acid has from about 16 to 22 carbon atoms.

11. The composition as claimed in claim 10 wherein the fatty acid is stearic acid.

12. The composition as claimed in claim 4 wherein the compound is taurine.

* * * * *